(12) United States Patent
Enenkiel

(10) Patent No.: US 8,548,939 B2
(45) Date of Patent: Oct. 1, 2013

(54) METHODS, SYSTEMS AND COMPUTER PROGRAMS FOR PROCESSING DATA IN A WORLD-WIDE-WEB SERVICE ENVIRONMENT

(75) Inventor: Achim Enenkiel, Karlsruhe (DE)

(73) Assignee: SAP AG, Walldorf (DE)

( * ) Notice: Subject to any disclaimer, the term of this patent is extended or adjusted under 35 U.S.C. 154(b) by 642 days.

(21) Appl. No.: 11/108,644

(22) Filed: Apr. 19, 2005

(65) Prior Publication Data

US 2006/0047764 A1 Mar. 2, 2006

(30) Foreign Application Priority Data

Apr. 21, 2004 (EP) ..................................... 04009396

(51) Int. Cl.
*G06F 17/30* (2006.01)

(52) U.S. Cl.
USPC ................ 707/607; 707/703; 705/77; 705/78

(58) Field of Classification Search
None
See application file for complete search history.

(56) References Cited

U.S. PATENT DOCUMENTS

| | | | | |
|---|---|---|---|---|
| 4,799,156 | A * | 1/1989 | Shavit et al. ..................... | 705/26 |
| 4,947,028 | A * | 8/1990 | Gorog ............................ | 235/380 |
| 5,317,688 | A * | 5/1994 | Watson et al. ................. | 715/707 |
| 5,383,113 | A * | 1/1995 | Kight et al. ...................... | 705/40 |
| 5,701,451 | A * | 12/1997 | Rogers et al. ...................... | 707/1 |
| 5,809,144 | A * | 9/1998 | Sirbu et al. ....................... | 705/53 |
| 5,991,733 | A * | 11/1999 | Aleia et al. ......................... | 705/8 |
| 6,389,403 | B1 * | 5/2002 | Dorak, Jr. ....................... | 705/52 |
| 6,442,526 | B1 * | 8/2002 | Vance et al. ...................... | 705/5 |
| 6,604,135 | B1 | 8/2003 | Rogers et al. | |
| 6,850,950 | B1 * | 2/2005 | Clarke et al. ................ | 707/104.1 |
| 7,707,120 | B2 * | 4/2010 | Dominguez et al. ............ | 705/78 |
| 2001/0049632 | A1 | 12/2001 | Rigole | |
| 2002/0087583 | A1 * | 7/2002 | Morgan et al. ................. | 707/200 |
| 2003/0172090 | A1 * | 9/2003 | Asunmaa et al. ............. | 707/200 |
| 2004/0133479 | A1 * | 7/2004 | Grove et al. ..................... | 705/26 |
| 2005/0065993 | A1 * | 3/2005 | Honda et al. ................... | 709/200 |

FOREIGN PATENT DOCUMENTS

| | | |
|---|---|---|
| EP | 0 969 430 A1 | 1/2000 |
| EP | 1 081 617 A2 | 3/2001 |
| WO | WO 02/037393 A2 | 5/2002 |

OTHER PUBLICATIONS

Anders Tornqvist et al., "XML and Objects—the future for e-Forms on the Web," Enabling Technologies: Infrastructure for Collaborative Enterprises, 1999. (Wet Ice '99). Proceedings IEEE 8th International Workshops on Stanford, CA, USA, Jun. 16-18, 1999, Los Alamitos, CA, USA, IEEE Compt. Soc., US, Jun. 16, 1999, pp. 303-308.
European Search Report, dated Dec. 3, 2004 (3 pages).

* cited by examiner

*Primary Examiner* — Debbie Le
(74) *Attorney, Agent, or Firm* — Finnegan, Henderson, Farabow, Garrett & Dunner, LLP

(57) ABSTRACT

Methods, systems and computer programs are provided for processing data in a web service environment. In accordance with one embodiment, a data processing method is provided that comprises: entering data values into respective data entry fields of an electronic data entry form of a first computer; entering an identifier of a web service into the first computer; initiating a data processing stage to be performed by a second computer on the basis of the data values entered into the electronic data entry form by the first computer; sending signalling data for signalling initiation of the data processing stage to a web service; and sending a result of the data processing stage to a third computer, the third computer being coupled to the web service.

29 Claims, 5 Drawing Sheets

METHODS, SYSTEMS AND COMPUTER PROGRAMS FOR PROCESSING DATA IN A WORLD-WIDE-WEB SERVICE ENVIRONMENT

DESCRIPTION OF THE INVENTION

1. Technical Field

The present invention generally relates to the field of data processing. More particularly, embodiments of the invention relate to methods, systems and computer programs for processing data in a World-Wide-Web ("WWW" or "web") service environment.

2. Background Information

The advent of web services has introduced the next generation of network collaboration, allowing a variety of applications to interact with other applications in a common goal of providing a desired service. In other words, a web service when activated performs a specific task and achieves a specific result. The examples of common web services include currency conversions, flight schedule lookups, and language translation services. For example, U.S. Pat. No. 6,604,135 discloses a method and system for locating web-based services.

The fact that the web-based applications are readily available to other web-based applications on the network allows almost instantaneous communication between the most remote users. Nevertheless, the reality involving a very large set of user population in a web service necessitates increased data control to avoid data inconsistencies and avoid the sending of duplicate data requests. Conventional approaches are not designed to provide the needed data control with preserved flexibility and ease of administration in the new web service environments.

Moreover, existing methodologies require extensive manual interaction and monitoring which consumes valuable human resources. The manual interaction is tedious and prone to errors. Thus, it would be advantageous to provide a solution that would remedy the problems of known methodologies and approaches.

SUMMARY

Embodiments consistent with the present invention may provide data processing methods using a web service. In one embodiment, a first computer is used for the entry of data values into respective data entry fields of an electronic data entry form. Further, an identifier of the web service such as the uniform resource locator (URL) of the web service is entered into the first computer. Next, the first computer initiates a data processing stage that is to be performed by a second computer on the basis of the data values entered into the electronic data entry form. Alternatively, the data processing stage is not to be performed by the second computer, but by the first computer or another component coupled to the first computer.

The initiation and/or performance or completion of the data processing stage may be signalled to the web service by the sending of corresponding signalling data. Further, the web service may be coupled to a third computer that receives a result of the data processing stage from the second computer, e.g., in the form of an XML data stream.

Advantageously, the third computer may be pre-warned regarding reception of the result from the first or second computer. For example, the third computer can periodically query the web service for signalling data that has been received by the web service. Alternatively, the web service implements a push service for pushing information to the third computer in response to receipt of the signalling data. The signalling data that the third computer receives from the web service can be used in various ways for control of the data processing performed by the third computer.

In accordance with one embodiment, the web service can be an integral part of the third computer. In this instance, the third computer has a web services interface for receiving signalling data in accordance with, e.g., the HTTP request-response protocol and an internal interface to a data processing and/or control application for synchronous or asynchronous further processing of the signalling data.

According to another embodiment, the web service is implemented on a separate web-server computer that is loosely or fixedly coupled to the third computer system. For example, the web service stores the signalling data that is addressed to the third computer in a data file. The resultant data file with the accumulated signalling data is forwarded from the web service to the third computer periodically, when the size of the file has reached a predetermined limit or at scheduled time intervals.

In another embodiment, the web service is implemented as a hub and collects signalling data for a plurality of third computer systems. In this instance, it is advantageous to store the signalling data in a database of the web-server using a unique identifier of the third computer to which the signalling data is addressed as a database key. The database is queried periodically for new signalling data that has been received for a given third computer in order to forward the new signalling data to the third computer.

By way of example, embodiments of the present invention can be used for industrial control applications. In this instance, the first computer is used as a control terminal for entry of control parameters and/or control commands by an operator. The data processing stage performed by the second computer is an industrial control function that provides a result which is transmitted from the second computer to the third computer after completion of the control function. The third computer is another component of the industrial control system for performance of another control function. The third computer is pre-warned regarding the execution of the control function of the second computer by means of the signalling data received by the web service that is coupled to it. This information is used in the third computer as a control parameter for execution of the third computer's industrial control functionality.

Another field of application for embodiments of the invention is financial transactions. For example, a customer receives an invoice from a service provider. The invoice can be received by the customer in paper form or in electronic form, such as in the form of an XML document. The payment data is manually or automatically entered into the customer's computer for initiation of the payment procedure. After completion of the data entry into the online payment transaction form, the payment data is transmitted to a second computer for execution of the payment. For example, the second computer is a computer of the customer's bank. The result of the data processing stage performed by the bank's computer, i.e., the execution of the payment, is transmitted as corresponding payment data to the third computer, i.e., a computer of the payee. When the payment procedure is initiated, the customer's computer and/or the bank's computer sends signalling data to the web service that is coupled to the payee's computer. Alternatively, the customer mails a paper form for ordering payment from his or her account to his or her bank. In this instance, the payment order data is entered into the bank's computer that takes the role of the first computer.

As an alternative to signalling initiation of the payment procedure, the planned execution date of the payment procedure may be communicated to the web service in order to announce the pre-scheduled payment. This has the advantage that the payee's computer can receive an early warning regarding the scheduled payment procedure. As a result, the sending of an unnecessary payment reminder can be avoided. Another advantage is that the scheduled payment can be entered into the payee computer's financial planning system.

As a consequence, the payee's computer is pre-warned that payment of an open invoice is imminent. This information can be used by the payee's computer to avoid sending unnecessary payment reminders for the purpose of financial planning and/or other purposes.

Another field of application for embodiment of the present invention is logistics and, in particular, supply chain management. For example, a customer sends a purchase order to his or her distributor. The purchase order data is entered into the customer's computer and the customer's computer initiates processing of the purchase order data by the distributor's computer. The customer's and/or the distributor's computer send(s) signalling data to a web service that is coupled to a manufacturer's computer in order to pre-warn the manufacturer regarding the purchase order. This information can be used by the manufacturer for production planning and, in particular, capacity planning and/or other manufacturing control purposes. After completion of the execution of the purchasing order by the distributor, the computer of the manufacturer receives a corresponding confirmation from the distributor's computer.

In another application scenario, a customer sends an order to a supplier. This can be done in ordinary paper form by mailing the order or by electronically sending an XML-document or another electronic message to the supplier. The supplier completes the order regarding availability, delivery time and order number. Alternatively, the supplier forwards the customer's order to a manufacturer which adds these details to the order. The commissioned order is sent to the web service of the customer. This has the advantage that the customer's logistic computer system is pre-warned regarding the scheduled delivery time of the ordered product for optimization of its supply chain management.

In accordance with another embodiment of the invention, the data values that are entered into the electronic data entry form provided by the first computer are received in electronic form, such as by means of an XML document. Further, the identifier of the web service is also received in electronic form by the first computer. In addition to the identification of the web service, the XML document can also comprise the WSDL (web service description language) description of the identified web service. It is to be noted that WSDL and UDDI are known and standardized, as evidenced by websites, including, for example MICROSOFT® and W3®.

In accordance with a further embodiment of the invention, the signalling data for signalling initiation of the data processing stage is directly sent from the first computer to the web service. Alternatively, the signalling data is sent from the second computer to the web service.

In accordance with yet another embodiment, the signalling data comprises an identifier of the second computer. The signalling data may be stored in a database provided by the web service using the identifier of the third computer as a key. The third computer can periodically query the web service's database in order to check if signalling data has been received and stored in the database. This can be implemented both as a push or a pull service of the web service.

It is to be noted that a database is not necessary for most applications. Rather, the signalling data may be stored in a data file by the web service. In such a case, the data file with the accumulated signalling data is transmitted, e.g., after pre-scheduled time intervals to the third computer.

In accordance with a further embodiment of the invention, the signalling data comprises a time stamp that indicates the time when the data processing step has been initiated or performed. The time information can be used as an additional control parameter by the third computer.

In accordance with a further preferred embodiment of the invention, a computer network, such as the Internet, an intranet or an extranet, provides the communication means for operatively coupling the first, second and third computers as well as the web service to the third computer.

According to another embodiment of the invention, the XML document is received by the first computer from the third computer. The XML document comprises data values and mark-up data being descriptive of the assignment of the data values to respective data entry fields of an electronic data entry form and an identifier of a web service.

In one embodiment, an XML document is received from a sender computer by a first computer, the XML document containing data values, mark-up data being descriptive of the assignment of data values to data entry fields of an electronic data entry form and an identifier of a web service.

The data values may be read by the first computer and entered into respective data entry fields of an electronic data entry form identified by the mark-up data.

In accordance with a further embodiment of the invention, a data processing stage is initialized on the basis of the data values entered into the electronic data entry form by the first computer and performance of the data processing stage is achieved using a second computer. The reading of the data values and the entering of the data values into respective data entry fields of an electronic data entry form may be performed as a result of a drag and drop action executed in a Graphical User Interface (GUI) environment. Then, the result of the data processing stage is sent to the sender computer by the second computer, and signalling data for signaling initiation of the data processing step is sent by the first computer to the web service.

In accordance with another embodiment of the invention, the XML document may include a control parameter utilized for execution of the data processing stage and the identifier of the web service may comprise an Uniform Resource Locator (URL). Further, each signalling data may comprise at least one of the data values, a time stamp identifying a date and time when at least one of the data values is sent, and an identifier identifying the sender computer.

In accordance with a further embodiment of the invention, the data processing may include an account payment procedure and the account payment procedure may include a rebate feature.

Advantageously, embodiments of the present invention may be used in applications where an early warning of a recipient's computer system regarding execution or scheduled execution of a data processing task to be performed by an external computer system positively impacts the recipient's computer system ability to execute its data processing tasks be it for the purposes of logistics such as supply chain management, industrial automation and control, or financial applications to name a few applications. In addition to the positive impact on the recipient's computer system performance, embodiments of the present invention may enable unnecessary overheads to be avoided, like the sending of unnecessary reminders or other messages from the recipient's computer system to one of the other involved computer systems or involved parties.

In accordance with yet another embodiment of the invention, a user friendly feature of a drag and drop function is provided to dynamically capture the data values that become available as a result of the utilization of the web service by a first computer. As a result, it is possible to instantaneously initiate the data processing performed by the second computer. Further, human error is eliminated on the side of the receiving party.

In consequence, embodiments of the present invention may provide improved end-to-end data processing in a web service environment and improved data control and monitoring without the loss of flexibility or speed of processing. Moreover, embodiments of the invention are applicable to a wide variety of web services, including online banking solutions.

Additional objects and advantages of embodiments consistent with the invention will be set forth in part in the description which follows, and in part will be obvious from the description, or may be learned by practice of embodiments of the invention. The objects and advantages of embodiments of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain principles consistent with the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Embodiments of the present invention are applicable to many different industries. One skilled in the art will appreciate that various embodiments and concepts of the invention are applicable to a wide array of industries without straying from the spirit and principles of the present invention.

Figure 1:
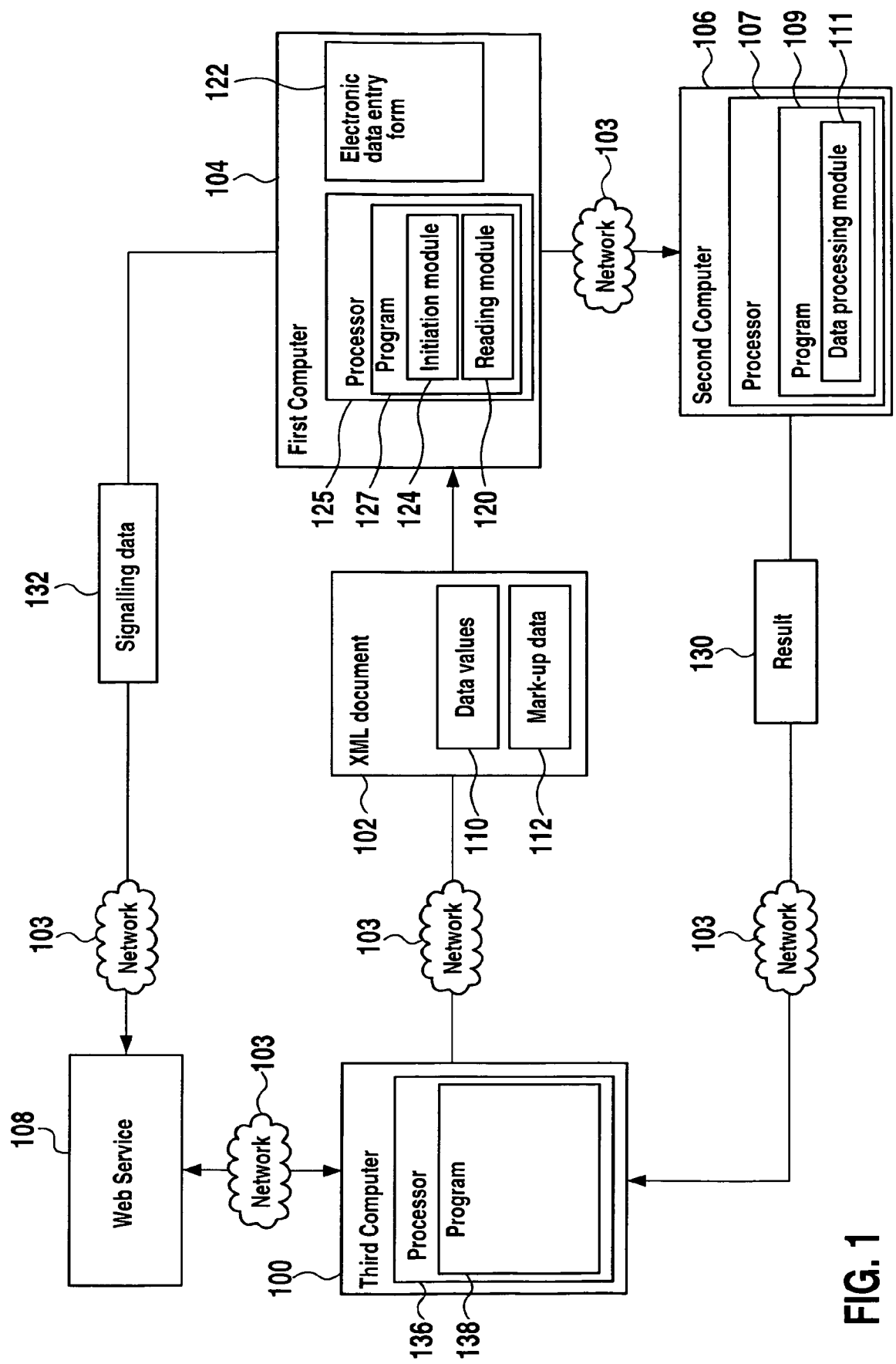
FIG. 1 illustrates an exemplary data processing system for processing data values received from a sender computer in a web-based service environment, consistent with an embodiment of the present invention.

FIG. 1 illustrates an exemplary data processing system, consistent with an embodiment of the present invention. In the example of FIG. 1, a third computer 100 is coupled through a network 103 with a first computer 104, a second computer 106 and web service(s) 108. An XML document 102 is sent from the third computer 100, comprising a processor 136 and a program 138, to the first computer 104.

The first computer 104 includes a processor 125 and a program 127 which further comprises a reading module 120, and an initiation module 124. The reading module 120 serves to capture data values 110 included in the XML document 102 and to enter these data values into respective data entry fields of an electronic data entry form 122 identified by the mark up data 112. The initiation module 124 serves to invoke a second computer 106 in order to begin the data processing step.

The XML document 102 comprises a set of data values 110 and a mark-up data 112 being descriptive of the assignment of data values to data entry fields of an electronic data entry form.

The second computer 106 includes a processor 107 and a program 109. The program 107 includes a data processing module 111 responsible for processing of the data values 110. When the second computer completes the data processing stage, it sends the result 130 of the data processing stage to the third computer 100 over the network 103. Also, signalling data 132 is sent by the first computer 104 to the web service 108.

Alternatively, the data processing stage is not performed by the second computer 106, but by the first computer 104.

In operation, the XML document 102 is received by the first computer 104 from a third computer 100. The processor 125 executes a program 127 which in turn starts the reading of data values 110 contained in the XML document 102. Then, the data values are entered automatically into respective data entry fields of an electronic data entry form 122 identified by the mark-up data 112. The capture of data values into the data fields of the electronic data form is accomplished by the utilization of reading module 120 allowing automatic capture of data values into the plurality of fields of an electronic data entry form 122. Alternatively, the data is entered manually. Next, a program 127 having an initiation module 124 starts the data processing stage by invoking the second computer 106. The second computer's processor 107 executes a program 109 having a data processing module 109 which on the basis of the data values entered into the electronic data entry form by the first computer performs the data processing stage ending in a result 130 being sent to the third computer 100 over the network 103.

Simultaneously, the first computer sends the signalling data 132 to the web service 108, where the signalling data is stored in the database of the web service 108. The signalling data is then further utilized for the controlling of the processing of the result 130 by the third computer 100, where the processor 136 executes the program 138 in order to determine when the result 130 is arriving from the second computer 106.

It is to be noted that the signalling data 132 can also be transmitted from the second computer 106 to the web service 108 via network 103 for signalling initiation or completion of the data processing stage performed by the data processing module 111. Further, it is to be noted that XML document 102 can be provided by a forth computer that is not shown in FIG. 1. In other words, the source of the XML document 102 and the receiver of result 130 do not need to be identical. In fact, the third and forth computers can belong to different organizational entities.

Further, it is to be noted that it is not essential for the present invention that the data values 110 are received in an electronic form. Embodiments of the present invention are also applicable to scenarios where the data values are received in paper form for scanned or manual entry into the electronic data entry form 122.

Figure 2:
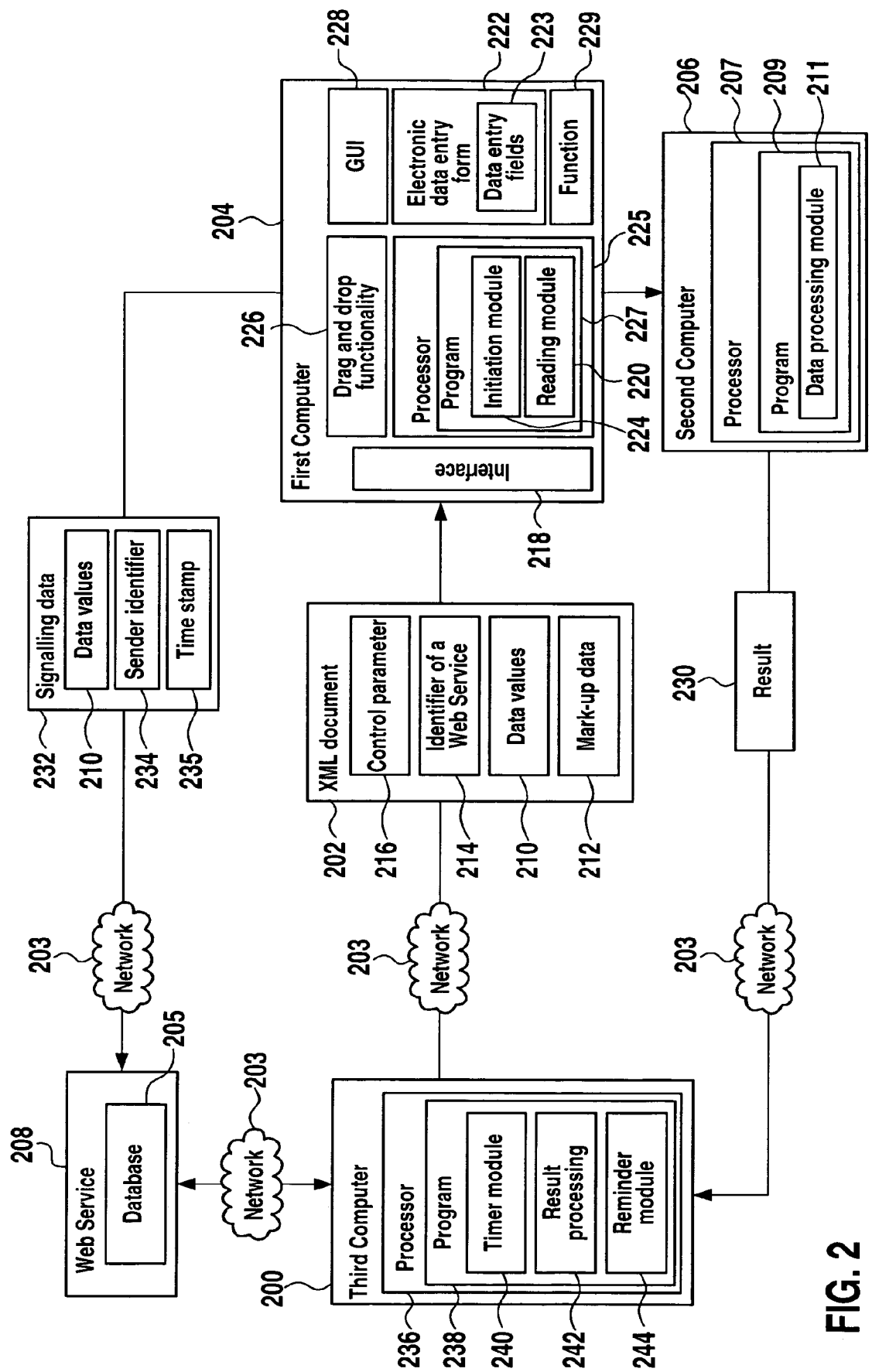
FIG. 2 illustrates a more detailed diagram of an exemplary data processing system for processing data values received from a sender computer in a web-based service environment, consistent with an embodiment of the present invention.

FIG. 2 illustrates a more detailed diagram of an exemplary data processing system for processing of the data values received from a sender computer in a web-based service environment, consistent with an embodiment of the present invention. The embodiment of FIG. 2 constitutes a logical continuation of FIG. 1 where like elements are referenced by like reference numbers having added a value of "100."

As shown in FIG. 2, a third computer 200 including a processor 236, a program 238, and a plurality of modules 240 to 244 is provided. The third computer 200 transmits an XML document 202 to a first computer 204. The XML document comprises a control parameter 216, an identifier of the web service (URL) 214, a set of data values 210, and mark-up data 212.

Alternatively, the document is received in ordinary paper form by a user of the first computer 204. In this case, the user needs to scan the paper form or to manually enter the data values into the electronic form provided by the first computer 204.

The first computer 204 includes a processor 225 and the program modules 227, 220 and 224. The program module 227 comprises a reading module 220 that captures the data values 210 and allows them to be entered into respective data entry fields including the compulsory fields of an electronic data entry form 222. The initiation module 224 serves to execute a data processing stage on the basis of the data values 210 entered into the electronic data entry form 222 by the first computer 204. The initiation module 224 invokes a second computer 206 to start the data processing stage.

The first computer 204 further comprises an interface 218 that is designed to recognize the format of the XML document 202. Program module 227 executes a function 229 that allows automatic filling out of the electronic data entry form 222 on the basis of the XML document's format. The automatic filling out of the form is performed when the user uses the drag and drop functionality 226 available in the graphical user interface environment 228.

The second computer 206 includes a processor which serves to execute program modules 209 and 211. Program module 209 has a data processing module 211 that is responsible for the processing of the data values. The result of the data processing step is sent to a third computer 200 utilizing a network 203. In the next step, the first computer 204 sends signalling data 232 to the web service 208 over the network 203.

The signalling data 232 comprises at least one of the data values 210, a time stamp 235, identifying a date and a time when at least one of the data values is sent, as well as sender identifier 234. The web service 208 comprises a database 205 for storage of signalling data 232.

In operation, utilizing a network 203, a third computer 200 sends an XML document 202 to the first computer 204. The XML document comprises a plurality of data values 210 and a control parameter 216 utilized for execution of the data processing stage, as well as identifier of a web service (URL) 214 and the mark-up data 212 being descriptive of the assignment of data values to the data entry fields of an electronic data entry form. The control parameter 216 offers a rule that is executed by the first's computer program 227 in order to determine the amount of the result 230. The data values are captured into the respective data entry fields 223 of an electronic data entry form 222 utilizing a reading module 220.

Then, the initiation module 224 invokes the second computer 206 and thus begins the data processing stage, whereby the user is able to control when the data values of the XML document are entered into the electronic data entry form by using drag and drop functionality 226. In one embodiment, it happens in such a way that in the graphical user interface 228 the user moves an icon of an XML document into the software containing the program 227 and, thus, the initiation module 224 is activated.

The processor 207 of the second computer 206 completes processing of data utilizing a data processing module 211. The result is sent to the third computer 200 utilizing the network 203. Simultaneously, the first computer sends the signalling data 232 to the web service 208, where the signalling data containing data values 210, the sender identifier 234, and the time stamp 235 is stored in the database 205 of the web service 208. Also, the control parameter 216 is communicated to the web service by the signalling data 232.

The signalling data 232 stored in the database 205 of the web service may be utilized for controlling the processing of the result 230. When the reminder module 244 determines that the result is overdue and that the reminder should be initiated it consults the signalling data 232 in order to find out if the result processing was initiated. If the result processing module 242 determines that signalling data contains the information that the data processing stage was initiated, the reminder module invokes a timer module 240 which is set for the predetermined amount of time to allow for the processing. However, if the predetermined amount of time expires and the result 230 still does not arrive, in this case the reminder module 244 initiates sending a reminder.

Figure 3:
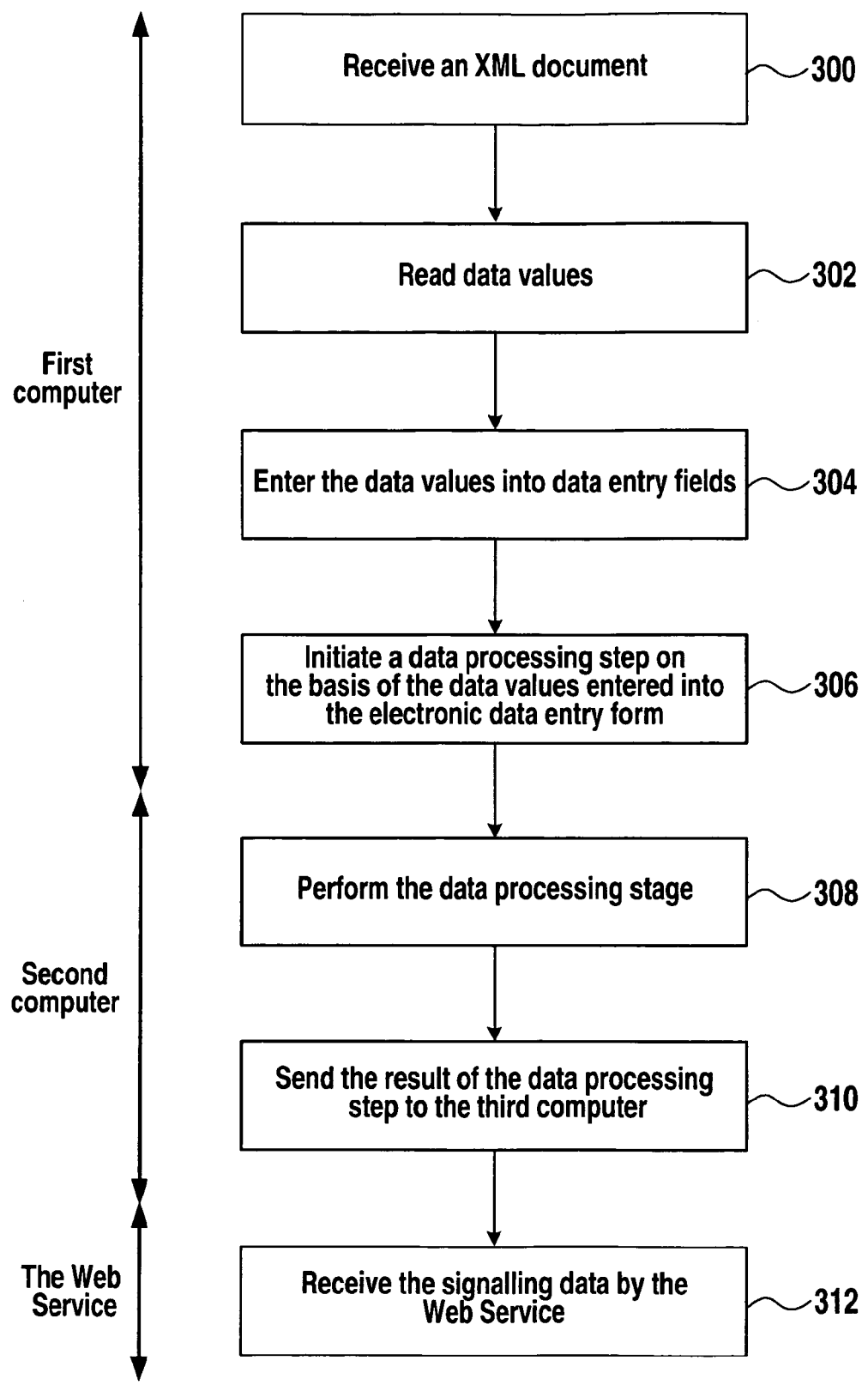
FIG. 3 is a flowchart of an exemplary process, consistent with an embodiment of the present invention.

FIG. 3 shows a flow chart an exemplary method, consistent with an embodiment of the invention. In step 300, an XML document is received from a sender computer by a first computer, the XML document containing data values, and mark-up data being descriptive of the assignment of data values to data entry fields of an electronic data entry form and an identifier of a web service. In the next step 302, the data values contained in the XML document are read by the reading module. In step 304, the data values are entered into respective data entry fields of an electronic data entry form identified by the mark-up data by the first computer. In step 306, a data processing stage is initiated on the basis of the data values entered into the electronic data entry form by the first computer. In step 308, the data processing step is performed using a second computer.

Then, in the step 310, the result of the data processing stage is sent to the sender computer by the second computer. In the last step 312, signalling data is sent for signalling initiation of the data processing stage by the first computer to the web service.

Figure 4:
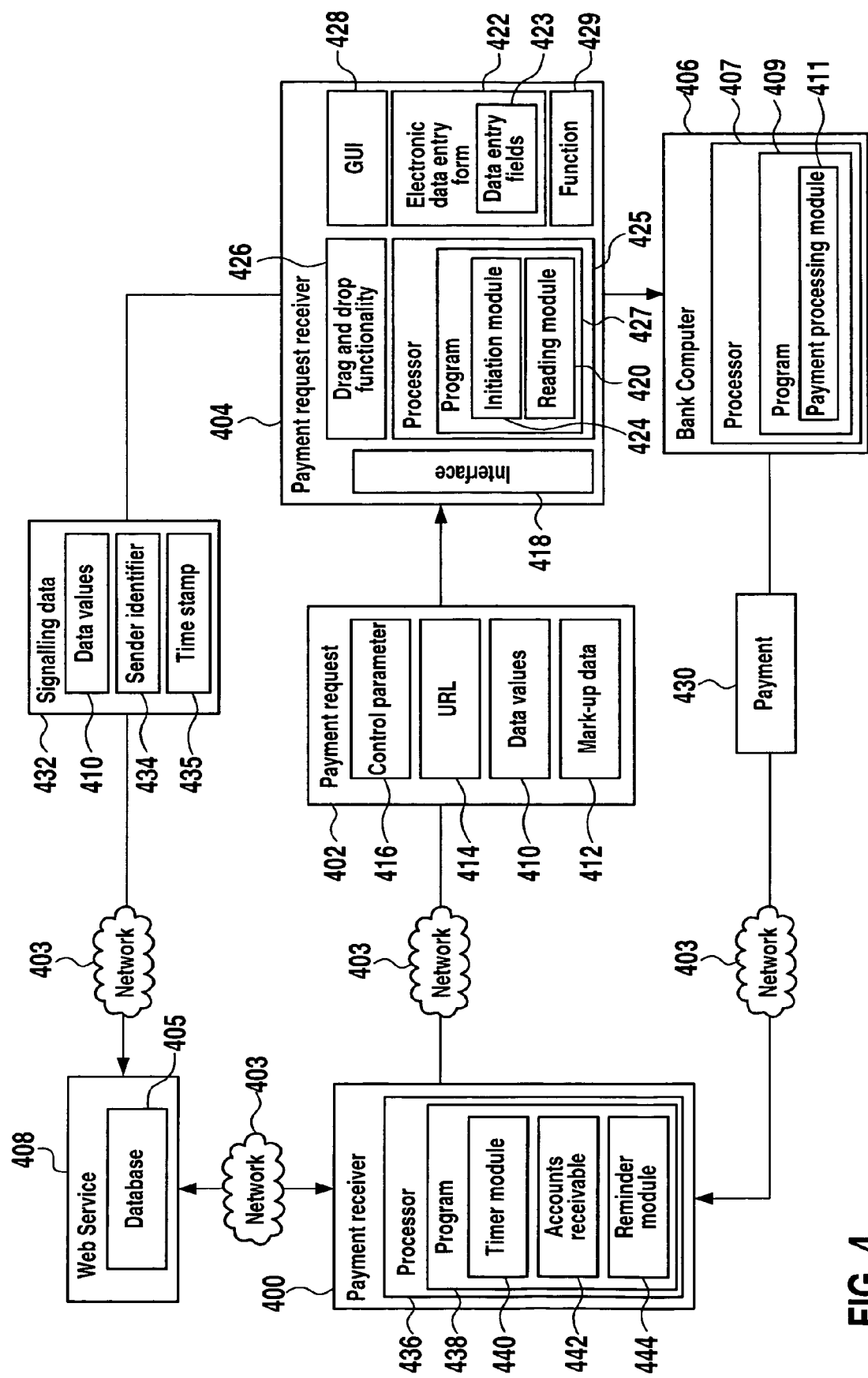
FIG. 4 illustrates an exemplary embodiment of a financial system for processing account information obtained from a sender computer in a web-based service environment.

FIG. 4 illustrates and another embodiment of a data processing system, consistent with the present invention. In the example FIG. 4, the data processing system is used as a financial/banking online system. Elements of FIG. 4 that correspond to elements of FIG. 2 are designated by like reference numerals.

Payment receiver 400 includes a processor 436 and a program 438 which comprises a timer module 440, an accounts receivable module 442, and a reminder module 444. Processor 436 serves to execute program modules 440, 442 and 444. Program 438 has an account receivable module 442 for processing of payment 430. The payment receiver 400 sends payment request 402 utilizing a network 403 to a payment request receiver 404. The payment request 402 comprises a control parameter 416, an Uniform Resource Locator (URL) 414, data values 410, and mark-up data 412. The mark-up data 412 is descriptive of the assignment of data values to their data entry fields of an electronic data entry form.

Alternatively, payment request 402 is received in the form of a paper document. Thus, it is not essential that payment request 402 is received in electronic form.

According to one embodiment, a first computer is a payment request receiver 404 comprising an interface 418, a processor 425, a program 427, an initiation module 424, and a reading module 420. The payment request receiver 404 further comprises an electronic data entry form 422 with the plurality of data entry fields 423, a graphical user interface 428, drag and drop functionality 426, and a function 429.

An interface 418 recognizes the format of the payment request 402. The format contains such payment information as credit organization, bank connection and the amount of the total payment. The processor 425 serves to execute the program modules 424 and 420. The initiation module 424 initiates a data processing stage on the basis of the data values entered into the electronic data entry form 422 by the first computer, in this case a payment request receiver 404. The performance of the data processing stage takes place using a second computer; in this embodiment, the second computer being a bank computer 406.

Program module 427 includes a reading module 420 which serves to capture the data values and enter them into respective data entry fields of an electronic data entry form 422. The electronic data entry form has a plurality of data entry fields 423. Program module 427 serves also to execute the function 429 which allows, on the base of format, to automatically fill out an electronic data entry form 422.

The reading of data values 410 and entering the data values into respective data entry fields 423 of an electronic data entry form 422 may be performed in a response to drag and drop functionality 426 used in a graphical user interface environment 428.

Bank computer 406 includes a processor 407 which serves to execute program modules 409 and 411. Program module 409 includes a payment processing module 411 which performs an operation resulting in sending the payment 430 to the payment receiver 400. The payment request receiver 404 or the bank computer 406 sends the signalling data 432 to the web service 408 utilizing a network 403. Each signalling data 432 comprises, e.g., at least one of the data values 410, a time stamp 435 identifying a date and/or a time when at least one of the data values is sent, and an identifier 434 identifying the payment receiver 400.

Signalling data 432 is stored in a database 405 of a web service 408 in order to be used for controlling of the processing of a payment 430.

In operation, payment receiver 400 sends payment request 402 to the payment request receiver 404 utilizing the network 403. When the payment request receiver 404 receives a payment request 402. The payment request 402 may include a URL, control parameter 416 utilized for execution of payment processing stage, and mark-up data 412 being descriptive of the assignment of data values to data entry fields 423, the reading of the data values 410 and entering of the data values 410 into respective data entry fields 423 takes place. The control parameter 416 may provide a rule that is executed by the payment request receiver 404 in order to determine the payment amount. For example the rule allows a discount of 3 percent if the payment is performed within a week.

Next, the payment processing stage is initiated on the basis of the data values entered with the help of initiation module 424 which invokes the bank computer 406 to start payment processing. The automatic filling out of electronic data entry form 422 takes place when the user using graphical user interface 428 drags and drops the icon of payment request 402 into the online banking software. Then, the program 427 executes the function 429 which allows on the base of the format of the payment request 402 to automatically fill out the electronic data entry form 422.

Subsequently, the processor 407 of the bank computer 406 executes the program 409 which includes a payment processing module 411 that completes the payment processing stage and sends the payment 430 to the payment receiver 400 utilizing the network 403.

In the next step, the payment request receiver 404 sends signalling data comprising at least one of the data values 410, a time stamp 435 identifying a date and the time when at least one of the data values is sent to the database 405 of a web service 408 and a sender identifier 434. The signalling data communicates also the control parameter 416 with the respective rules containing information about the rebate amount to the web service. Subsequently, the signalling data 432 is stored in a database 405, in order to be used for controlling the processing of a payment by accounts receivable 442.

As an alternative to sending the signalling data after completion of the payment processing stage, the signalling data may already be sent when the order for performance of the payment processing stage is generated or sent to the bank computer 406 by request receiver 404 or when the order is received by bank computer 406. In this instance, it is preferred that the signalling data includes the date of the planned payment.

When the reminder module 444 determines that the payment 430 is overdue, instead of sending the reminder right away it attempts to find out if payment was initiated on the basis of the signalling data 432. If accounts receivable module 442 determines that the signalling data contains the information that the payment 430 was initiated, the reminder module invokes a timer module 440 which is set for the predetermined amount of time to allow for the processing. However, if the predetermined amount of time expires and the payment still does not arrive, in this case the reminder module 444 initiates sending a reminder.

Utilizing the signalling data 432 which communicates also the control parameter 416 with the rules governing the payment amount allows the incorporation of a rebate feature in the account payment procedure allowing different amounts of a discount, for example 3%, 5% or 10%, based on the amount of time that passes until the actual payment 430 is received.

Figure 5:
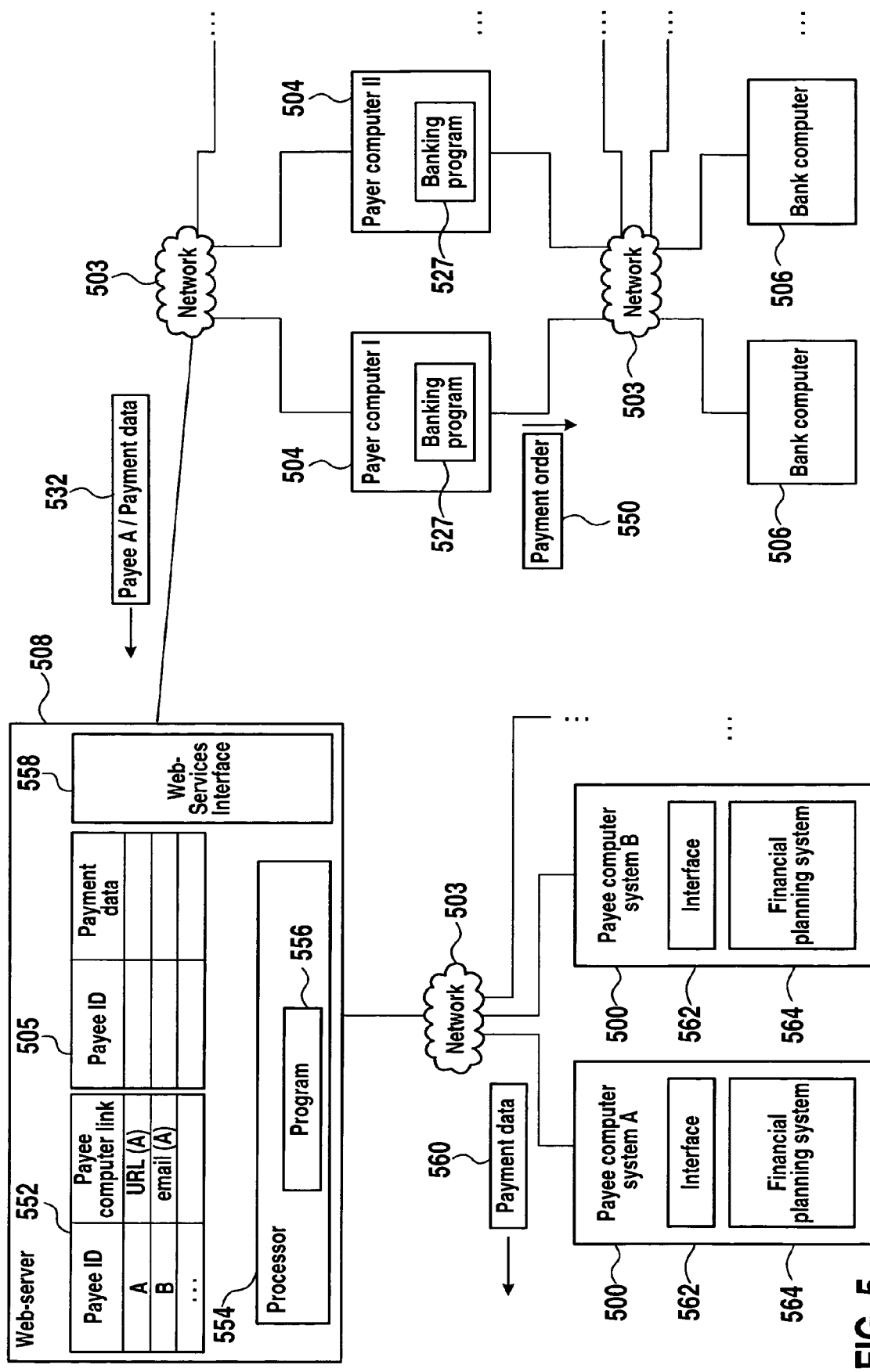
FIG. 5 illustrates a block diagram of a further exemplary embodiment of a data processing system consistent with the principles of the invention.

FIG. 5 shows a block diagram of another exemplary data processing system. Elements in the embodiment of FIG. 5 corresponding to elements of FIG. 1, 2, or 4 are designated by like reference numerals. The embodiment of FIG. 5 includes a plurality of first computers 504 that belong to respective payers I, II, . . . etc. Each one of the first computers 504 includes a banking program 527 for entering a payment order 550. Likewise, a plurality of bank computers 506 are coupled to the plurality of first computers 504 via Internet 503.

The first computers 504 of the payers and/or the bank computers 506 can send signalling data 532 to web server 508 via Internet 503. The signalling data 532 includes at least an identifier of the payee that is to receive the payment and payment data, such as the amount of the payment and a pre-scheduled date when the payment procedure is to be executed and/or payment is expected to be received by the payee.

Web server 508 includes a storage 505 for storage of the signalling data it has received for the various payees that are registered in table 552. Table 552 has an entry for each registered payee comprising the payee's identifier and address information regarding the payees computer, such as the payee's computer URL, email address and/or other link information for sending electronic data.

Web server 508 includes a processor 554 for execution of computer program 556. Web services interface 558 of web server 508 serves for communication in accordance with the HTTP request-response protocol via Internet 503, in particular, for receiving the signalling information 532.

A plurality of third computers 500 belonging to respective payees A, B ... etc. may be coupled to web server 508 via Internet 503. Each of the third computers 500 includes a web interface 562 and a financial planning system 564.

In operation, one of the payers enters a payment order into its computer system. For purposes of illustration, payer I is considered in the following. In response to the payer's I entry of the payment data into banking program 527, payment order 550 is transmitted via Internet 503 to payer's I bank's computer, i.e., one of the computers 506.

In addition, signalling data 532 is sent from payer's I computer 504 to webserver 508 via Internet 503. Alternatively, the bank computer 506 sends signalling data 532 after receipt of payment order 550. Signalling data 532 is received by web services interface 558 of web server 508 and is entered into storage 505. Consecutively, web server 508 may receive a sequence of additional signalling data 532 from various computers 504 of other payers or from various other bank computers 506. The respective signalling data is collected in storage 505 of web server 508 using the respective payee identifiers as a key.

The accumulated signalling data that is stored in storage 505 is transmitted to the respective payee computer systems 500 at periodic time intervals, each time new signalling data comes in, when the accumulated signalling data has reached a given size, at prescheduled points of time or using other trigger criteria.

For example, program 556 processes each entry of table 552 by reading the respective accumulated payment data from storage 505 and sending the payment data as payment data 560 to the link given in table 552 for the respective payee via Internet 503 to the respective payee's computer system 500. In the example considered here, the payment data 560 of signalling data 532 is read from storage 505 and sent to the URL of payee computer system A 500 where it is received by interface 562. Payment data 560 is entered into financial planning system 564.

Embodiments of the invention can be implemented in digital electronic circuitry, or in computer hardware, firmware, software, or in any combination thereof. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods consistent with the present invention can be performed by one or more programmable processors executing a computer program to perform functions or steps of such methods by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, embodiments of the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

LIST OF REFERENCE NUMERALS

100 Third computer
102 XML document
103 network
104 First computer
106 Second computer
108 Web Service
110 Data values
112 Mark up data
120 Reading module
124 Initiation module
125 processor
126 Drag and drop functionality
127 program
130 result
132 Signalling data
136 processor
138 program
200 Third computer
202 XML document
203 network 204 First computer
206 Second computer
207 processor
208 Web Service
209 program
210 Data values
211 Data processing module
212 Mark up data
214 Identifier of a Web Service
216 Control parameter
218 interface
220 Reading module
222 Electronic data entry form
224 Initiation module
225 processor
226 Drag and drop functionality
227 program
228 Graphical User Interface
230 result
232 Signalling data
234 Sender identifier
235 Time stamp
236 processor
238 program
240 Timer module
242 Result processing
244 Reminder module
400 Payment Receiver
402 Payment request
403 network
404 Payment request receiver
405 database
406 Bank computer
407 processor
408 Web Service
409 program
410 Data values
412 Mark up data
414 Uniform Resource Locator (URL)
416 control parameter
418 interface
420 Reading module
422 Electronic data entry form
424 Initiation module
425 processor
426 Drag and drop functionality
427 program
428 Graphical User Interface
430 result
432 Signalling data
434 Sender identifier
435 Time stamp
436 processor
438 program
440 Timer module
442 Accounts receivable
444 Reminder module
500 Payee computer system
503 Internet
504 Payer computer
506 Bank computer
508 Web-server
527 Banking program
532 Signalling data
550 Payment order
552 Table
554 Processor
556 Computer program
558 Web services interface
560 Payment data
562 Interface
564 Financial planning system.

What is claimed is:

1. A data processing method, comprising the steps of:
receiving an XML document by a first computer from a third computer through a network, wherein the XML document includes a control parameter, and the control parameter identifies a data processing rule that specifies a condition on a payment amount;
entering data values from the XML document received by the first computer from the third computer through the network into respective data entry fields of an electronic data entry form of a first computer, wherein processing of at least one of the data values with the first computer occurs prior to entry into the electronic data entry form, and the processing occurs by automatically capturing, in the first computer, the data values from the XML document received in the first computer from the third computer through the network;
entering an identifier of a web service into the first computer;
calculating the payment amount using the data values entered into the electronic data entry form of the first computer, wherein calculating the payment amount includes executing the data processing rule and including the calculated amount of the payment in a result;
sending signalling data for signalling at least one of scheduling, initiation, performance, and completion of the calculation of the payment amount to a web service; and
sending the result of the calculated payment amount to the third computer, the third computer being coupled to the web service.

2. The data processing method of claim 1, further comprising providing the signalling data from the web service to the third computer prior to receipt of the result by the third computer.

3. The data processing method of claim 1, the XML document includes the data values and mark-up data that is descriptive of the assignment of the data values to the data entry fields of the electronic data entry form and the identifier of the web service; and the method further comprises:
automatically entering the data values into the respective data entry fields and automatically entering the identifier of the web service.

4. The data processing method of claim 1, wherein the signalling data is sent from the first computer to the web service.

5. The data processing method of claim 1, wherein the calculation of the payment amount is performed by a second computer and the signalling data is sent from the first and/or the second computer to the web service.

6. The data processing method of claim 1, the control parameter specifying a price rebate.

7. The data processing method of claim 1, wherein the calculation of the payment amount comprises an account payment procedure.

8. The data processing method of claim 1, wherein the identifier of the web service is a uniform resource locator (URL).

9. The data processing method of claim 1, wherein the signalling data comprises at least one of the data values that has been entered into the electronic data entry form, a time stamp identifying a date and time when the calculation of the payment amount has been scheduled, initiated and/or performed, and an identifier for identification of the third computer.

10. The data processing method of claim 9, the third computer using its identifier for querying the web service.

11. The data processing method of claim 1, wherein the entry of the data values and the identifier of the web service is performed in response to a drag and drop operation.

12. A data processing system comprising:
a first computer for entering data values into respective data entry fields of an electronic data entry form received from a third computer and for entering an identifier of a web service, the first computer comprising:
    a processor receiving an XML document by the first computer from the third computer through a network, wherein the XML document includes a control parameter, and the control parameter identifies a data processing rule that specifies a condition on a payment amount; and
    a processor calculating the payment amount using the data values from the XML document received by the first computer from the third computer through the network entered into the electronic data entry form, wherein processing of at least one of the data values with the first computer occurs prior to entry into the electronic data entry form, and the processing occurs by automatically capturing the data values, in the first computer, from the XML document received in the first computer from the third computer through the network;
a second computer for performing the calculating of the payment amount, wherein the calculating of the payment amount includes executing the data processing rule to calculate the payment amount and include the calculated amount in a result, and sending the result of the calculated payment amount to the third computer; and
a web service coupled to the third computer, the web service being adapted to receive signalling data that signals at least one of scheduling, initiation and completion of the calculation of the payment amount.

13. The data processing system of claim 12, the first computer being adapted to send the signalling data to the web service.

14. The data processing system of claim 12, the second computer being adapted to send the signalling data to the web service.

15. The data processing system of claim 12, the signalling data comprising at least one of the data values that has been entered into the electronic data entry form, a time stamp identifying a date and/or time when the calculation of the payment amount has been scheduled, initiated and/or performed, and an identifier for identification of the third computer.

16. The data processing system of claim 12, the web service comprising a database for storing the signalling data using the identifiers of the third computer as keys.

17. The data processing system of claim 12, the web service implementing a push or a pull service for the third computer.

18. A non-transitory computer-readable storage medium comprising instructions for causing a computer system to perform a data processing method, the method comprising the steps of:
receiving an XML document by a first computer from a third computer through a network, wherein the XML document includes a control parameter, and the control parameter identifies a data processing rule that specifies a condition on a payment amount;
entering data values from the XML document received by the first computer from the third computer through the network into respective data entry fields of an electronic data entry form of a first computer, wherein processing of at least one of the data values with the first computer occurs prior to entry into the electronic data entry form, and the processing occurs by automatically capturing, in the first computer, the data values from the XML document received in the first computer from the third computer through the network;
entering an identifier of a web service into the first computer;
calculating the payment amount using the data values entered into the electronic data entry form of the first computer, wherein calculating the payment amount includes executing the data processing rule and including the calculated amount of the payment in a result;
sending signalling data for signalling at least one of scheduling, initiation, performance, and completion of the calculation of the payment amount to a web service; and
sending the result of the calculated payment amount to the third computer, the third computer being coupled to the web service.

19. The non-transitory computer-readable storage medium of claim 18, wherein the method further comprises providing the signalling data from the web service to the third computer prior to receipt of the result by the third computer.

20. The non-transitory computer-readable storage medium of claim 18, wherein the XML document includes the data values and mark-up data that is descriptive of the assignment of the data values to the data entry fields of the electronic data entry form and the identifier of the web service; and the method further comprises:
    automatically entering the data values into the respective data entry fields and automatically entering the identifier of the web service.

21. The non transitory computer-readable storage medium of claim 18, wherein the signalling data comprises at least one of the data values that has been entered into the electronic data entry form, a time stamp identifying a date and time when the calculation of the payment amount stage has been scheduled, initiated or performed, and an identifier for identification of the third computer.

22. A computer-implemented system including a processor, the system comprising:
a processor receiving an XML document by a first computer from a third computer through a network, wherein the XML document includes a control parameter, and the control parameter identifies a data processing rule that specifies a condition on a payment amount;
a processor entering data values from the XML document received by the first computer from the third computer through the network into respective data entry fields of an electronic data entry form, wherein processing of at least one of the data values with the first computer occurs prior to entry into the electronic data entry form, and the processing occurs by automatically capturing, in the first computer, the data values from the XML document received in the first computer from the third computer through the network;
a processor entering an identifier of a web service;
a processor calculating the payment amount using the data values entered into the electronic data entry form of the first computer, wherein calculating the payment amount includes executing the data processing rule and including the calculated amount of the payment in a result;

a processor sending signalling data for signalling at least one of scheduling, initiation, performance and completion of the calculation of the payment amount to a web service; and a processor sending the result of the calculated payment amount to the third computer, the third computer being coupled to the web service.

23. The computer-implemented system of claim 22, further comprising a processor providing the signalling data from the web service to the third computer prior to receipt of the result by the third computer.

24. The computer-implemented system of claim 22, wherein:

the XML document includes the data values and mark-up data that is descriptive of the assignment of the data values to the data entry fields of the electronic data entry form and the identifier of the web service; and the system further comprises a processor automatically entering the data values into the respective data entry fields and automatically entering the identifier of the web service.

25. The computer-implemented system of claim 22, wherein the signalling data comprises at least one of the data values that has been entered into the electronic data entry form, a time stamp identifying a date and time when the calculation of the payment amount has been scheduled, initiated or performed, and an identifier for identification of the third computer.

26. A data processing method comprising:

entering data values received by a first computer from a third computer through a network into respective data entry fields of an electronic data entry form of the first computer;

calculating the payment amount using data values entered into the electronic data entry form of the first computer, wherein calculating the payment amount includes executing a data processing rule and including the calculated payment amount in a result;

entering an identifier of a web service into the first computer;

sending signalling data for signalling scheduling, initiation, performance, or completion of the calculation of the payment amount to a web service;

sending the result of the calculation of the payment amount to a third computer, the third computer being coupled to the web service; and providing the signalling data from the web service to the third computer prior to receipt of the result by the third computer, for control of the data processing performed by the third computer, wherein the third computer comprises a reminder module for determining when a result is overdue, a timer module, and a result processing module, invoking the result processing module in order to determine if processing of the overdue result was initiated, invoking the timer module if the result processing module determines that the signalling data contains information that the calculation of the payment amount was initiated, setting the timer module for a predetermined amount of time to allow the processing of the overdue result, and sending a reminder, at the request of the reminder module, if the predetermined amount of time expires prior to arrival of the result.

27. The data processing method of claim 26, wherein the calculation of the payment amount is performed by a second computer and the signalling data is sent from the first or the second computer to the web service.

28. A data processing apparatus comprising:

a processor entering data values received from a third computer through a network into respective data entry fields of an electronic data entry form;

a processor initiating a payment amount calculating step on the basis of the data values received from the third computer through the network entered into the electronic data entry form of the first computer, wherein the payment amount calculating step includes executing a data processing rule and including the calculated payment amount in a result;

a processor entering an identifier of a web service;

a processor sending signalling data for signalling scheduling, initiation, performance, or completion of the payment amount calculating step to a web service;

a processor sending the result of the payment amount calculating step to the third computer, the third computer being coupled to the web service; and a processor providing the signalling data from the web service to the third computer prior to receipt of the result by the third computer, for control of the data processing performed by the third computer, wherein the third computer comprises a reminder module for determining when a result is overdue, a timer module, and a result processing module, wherein the reminder module invokes the result processing module for determining if processing the overdue result was initiated, wherein the reminder module invokes the timer module if the result processing module determines that the signalling data contains the information that the payment amount calculating step was initiated, wherein the timer module is set for a predetermined amount of time to allow for the processing of the overdue result, wherein the reminder module initiates sending a reminder if the predetermined amount of time expires prior to arrival of the result.

29. The data processing apparatus of claim 28, wherein a second computer performs the payment amount calculating step and the signalling data is sent from the first and/or the second computer to the web service.

* * * * *